Patented Dec. 5, 1950

2,532,548

UNITED STATES PATENT OFFICE 2,532,548

METHOD FOR DISPOSAL OF WASTE PICKLE LIQUOR

Samuel S. Heide, Birmingham, Ala., assignor to Tennessee Coal, Iron and Railroad Company, a corporation of Alabama No Drawing. Application April 7, 1948, Serial No. 19,650

4 Claims. (Cl. 71—31)

This invention relates to the disposal and utilization of steel-mill wastes and, in particular, to a method of disposing of waste pickle liquor and salvaging the solute.

Pickle liquor, a dilute solution of sulphuric acid, is used in large volumes by the steel industry and the disposition of the spent liquor, a mixed solution of ferrous sulphate and acid, presents a serious problem. This problem is growing more pressing because of restrictions against stream pollution now becoming common, which limit the disposition by natural drainage of liquids inimical to utilization of natural waters for industrial and municipal supplies. Several methods for the disposal of waste liquor have been proposed but none of them has been widely adopted, so far as I am aware. One such method involves neutralization by milk of lime, limestone or dolomite; another the conversion of remaining acid to ferrous sulphate and recovery of the latter by concentration; and still another the recovery of ferrous sulphate by crystallization and the concentration of the remaining acid ("The Making, Shaping and Treating of Steel," Camp and Francis, 5th edition, page 1192). All these methods are costly because of the use of added neutralizing material and the necessity of treating large volumes of liquid or the heat required for evaporating the water content.

I have invented a novel method of disposing of waste pickle liquor which is simple and inexpensive to carry out and results in a product of commercial value. Essentially, my method comprises bringing the liquor into contact with molten blast-furnace slag. The heat of the slag evaporates the water of the liquor and the slag becomes granulated by the resultant quick cooling. The ferrous salt and acid dissolved in the liquor are decomposed and combine with a part of the calcium oxide or other basic material of the slag, resulting in a product of substantial value as a fertilizer filler. Since the slag, like the liquor, is a waste product, this value is almost clear gain, without counting the advantage obtained in the disposition of the waste liquor.

The method of my invention may be carried out in almost any convenient manner. Since greater efficiency may be obtained by processing materials in large quantities, I preferably employ a large refractory-lined container, run the liquor into the container and then dump molten slag into the liquor. For instance, in one typical practice which proves effective, a pit 40' x 10' x 8' deep is excavated in clay and slag poured therein to a depth of about 1' from ladle cars on a track along one side thereof, to form a bottom or lining. Several thousand gallons of waste pickle liquor are then delivered to the pit and molten blast-furnace slag is poured into the liquor in an amount having a weight about equal to or somewhat less than that of the liquor. The liquor is at atmospheric temperature and on contact therewith, the slag is granulated by the sudden cooling and the liquor disposed of by evaporation of the water and combination of the solute with the lime or other basic material of the slag. The granulated slag may be removed from the pit by a grab-bucket and dried for crushing and screening preparatory to shipment. The steam generated by the heat of the slag effectively agitates the mixture and assures substantially complete combination of the sulphate radical of the liquor with the lime of the slag.

In another example of the practice of my invention, a larger amount of liquor, say several hundred thousand pounds of liquor, may readily be disposed of by dumping molten slag therein, as explained above. The ratio of the amount of slag required is about .82 lb. of slag per pound of liquor. A somewhat smaller ratio, say .75, may suffice if good distribution of the slag in the liquor is obtained, i. e., by moving the ladles back and forth a substantial distance while pouring the slag. In one instance, the liquor analysis was: water, 87.1%; free $H_2SO_4$, 4.6%; $FeSO_4$, 8.3%. Its specific gravity was 1.116 giving a weight of 9.3 lb. per gallon. The analysis of the blast-furnace slag was:

| FeO | $SiO_2$ | $Al_2O_3$ | CaO | MgO | MnO | S | $K_2O$ | $Na_2O$ |
|---|---|---|---|---|---|---|---|---|
| .21 | 37.12 | 9.09 | 40.27 | 11.09 | .40 | 1.10 | 1.04 | .21 |

After granulation, the slag gave the following analysis:

| FeO | $Fe_2O_3$ | $SiO_2$ | $Al_2O_3$ | CaO | MgO | MnO | CaS | $CaSO_4$ | Total $K_2O$ | 2% citric acid soluble | $H_2O$ Soluble $K_2O$ | Total $Na_2O$ |
|---|---|---|---|---|---|---|---|---|---|---|---|---|
| .79 | 2.19 | 35.88 | 9.26 | 32.41 | 8.31 | .40 | 1.40 | 5.02 | .90 | (.73 $K_2O$) | .23 | .18 |

Balance, $H_2O$.

Material of this analysis is a highly desirable soil conditioner or fertilizer filler. For this purpose, it is an improvement over slag granulated in water as well as vegetable matter, such as peanut-hull bran or furfural residue. This is because the metallic compounds are rendered more readily available as plant food. The material may be readily crushed to the desired fineness. Its characteristics make it easy and harmless to handle. They also eliminate any difficulty in storage or distribution. The product is porous but non-hygroscopic, weighing about 62 pcf. When mixed (up to 20%) with fertilizer materials, such as super-phosphate, muriate of potash, ammonium sulphate or ammonium nitrate solution, it may be stored without lumping or caking, heating up, loss of ammonia or reversion of soluble $P_2O_5$. The presence of about ¾% of potash ($K_2O$) soluble in 2% citric acid is particularly advantageous.

Instead of dumping molten slag in a pool of liquor, I may discharge a stream of liquor against a stream of slag in the manner now practiced in granulating slag by contact with water. I may also provide a cooling tower or hood for condensing the vapor arising from the pit on contact of the molten slag with the liquor. I may also drain unconsumed liquor from the pit and recirculate it to a stream of entering slag to increase the efficiency.

The invention has other advantages, of course, besides the value of the resulting by-product. The principal advantage, indeed, is that it makes possible the effective disposal of pickle liquor at practically no cost since the neutralizing agent, blast-furnace slag, is a waste material and, as tapped from the furnace, carries sufficient heat for evaporation and agitation of the liquor, thus eliminating the need for externally supplied heat or power. The water content of the liquor, after being evaporated, may be discharged into the air as steam or condensed and run off through natural drainage channels without causing pollution. The basic ingredients of the slag serve to decompose the acid and salt dissolved in the liquor and neutralize the former. The product, as noted in the above analysis, has a substantial calcium sulphate content, i. e., in the neighborhood of 5%, while the slag as tapped from the furnace has none.

Although I have disclosed herein but a preferred practice of my method, it will be evident that changes in the procedure described may be made without departing from the spirit of the invention or the scope of the appended claims.

I claim:

1. In a method of disposing of waste pickle liquor comprising small amounts of sulphuric acid and ferrous sulphate in aqueous solution, the steps including bringing molten blast-furnace slag into contact with said liquor whereby the water of the liquor quenches and granulates the slag and is largely evaporated by the heat of the slag, and the basic components of the slag react with the solute of the liquor.

2. The method defined by claim 1 characterized by accumulating a pool of liquor and pouring the molten slag into the pool.

3. The method defined by claim 1 characterized by directing a stream of liquor into a stream of molten slag.

4. The method defined by claim 1 characterized by maintaining the ratio of slag to liquor at less than unity.

SAMUEL S. HEIDE.

REFERENCES CITED

The following references are of record in the file of this patent:

UNITED STATES PATENTS

| Number | Name | Date |
|---|---|---|
| 238,240 | Lippincott | Mar. 1, 1881 |
| 1,310,382 | Auld et al. | July 15, 1919 |
| 1,384,974 | Shaw | July 19, 1921 |
| 1,386,331 | Heckman | Aug. 2, 1921 |
| 1,428,633 | Hoffman | Sept. 12, 1922 |

FOREIGN PATENTS

| Number | Country | Date |
|---|---|---|
| 363,550 | Great Britain | Dec. 24, 1931 |

OTHER REFERENCES

Hodge: Industrial and Engineering Chemistry, vol. 31, No. 11, Nov. 1939, pages 1364–1380.